March 2, 1943.     F. ROTTMAYR     2,313,022
PROCESS FOR PURIFYING GASES
Filed March 6, 1940
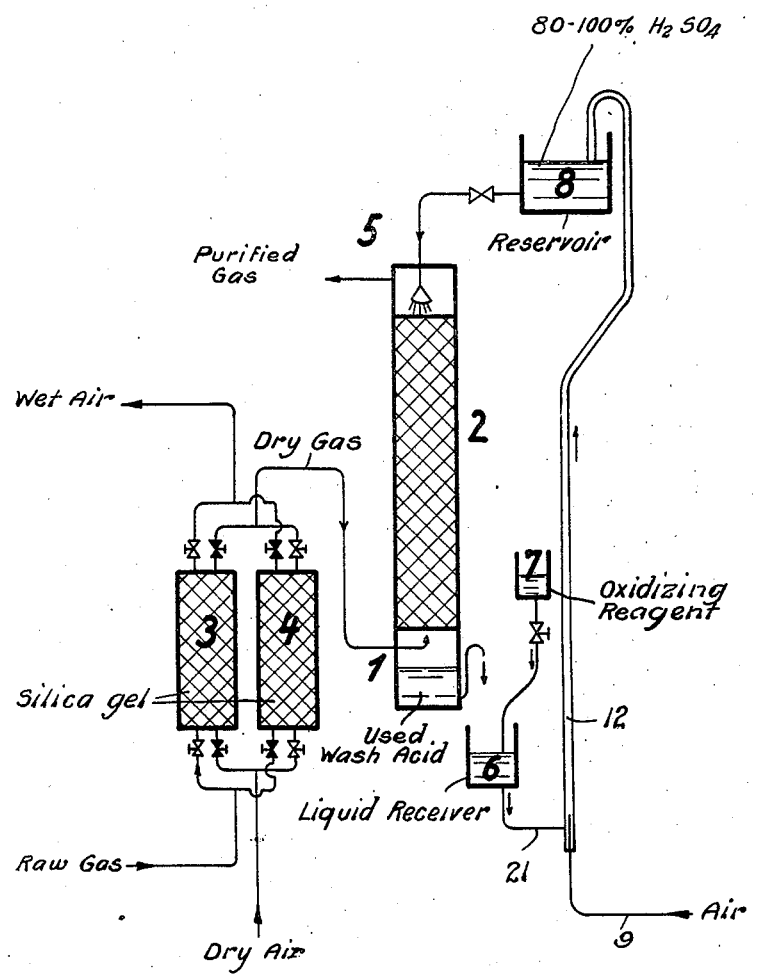

Patented Mar. 2, 1943

2,313,022

UNITED STATES PATENT OFFICE 2,313,022

PROCESS FOR PURIFYING GASES

Friedrich Rottmayr, Pullach, near Munich, Germany; vested in the Alien Property Custodian Application March 6, 1940, Serial No. 322,638
In Germany March 30, 1939

6 Claims. (Cl. 23—3)

The invention relates to a process for the elimination of hydrogen phosphides from gases. The process is intended chiefly for the purification of acetylene, but it can serve also for the removal of hydrogen phosphides contained in other gases.

Up till now hydrogen phosphides were removed from generated acetylene chiefly by the use of solid purification materials, but these methods have important disadvantages such as small reaction capacity and an inefficient utilization of the solid purification materials. Generally the solid purification materials cannot be regenerated. Because the solid purifying materials have a poor efficiency and react only slowly with the impurities, it is necessary to use large amounts of material. For these reasons the purifiers have to be disproportionately large and their filling is a very troublesome and time consuming task.

The employment of solid purification materials which cannot be regenerated is usually very inefficient and often it is made still worse by the fact that the material reacts with acetylene. The efficiency of purifiers filled with solid purifying material is further impaired in that some of the purifiers may fail to work, because of channelling and lack of uniform charging whereby the gas is permitted to pass through the purifiers unchanged. Finally a considerable loss of gas must be reckoned with always when starting a new purifying chamber and sweeping out the same with gas for expelling any air.

According to the present invention these difficulties can be avoided by washing out the hydrogen phosphides with an appropriate washing liquid. It is known that owing to their basic character hydrogen phosphides can be dissolved in concentrated mineral acids and especially in concentrated sulphuric acid, but an economical technical process for removing $PH_3$ from $C_2H_2$ could not be derived from this knowledge. The reason is that the efficiency of the washing liquid quickly diminishes with the increasing enrichment in hydrogen phosphides. Up to date no suitable process for regenerating the acid was known.

In the following the invented process is described by way of an example for the special case of purifying acetylene. Figure 1 shows a scheme of the apparatus arrangement. Chiefly to separate the moisture from the acetylene, which otherwise would cause a gradual dilution of the washing liquid the raw acetylene is conducted alternately through two towers 3 and 4 filled with silicagel, before it enters the scrubber 1 which is washed with sulphuric acid. When the silicagel in one of the towers 3 is laden with water, the gas is led into the second tower 4 and the silicagel laden with water is warmed and simultaneously regenerated in the known manner by passing a dry gas through it, for instance air. The scrubber 2 which is suitably filled with filling materials is washed with sulphuric acid of 80–100%, by which the phosphides are washed out by conducting the acetylene in countercurrent to the fluid. The purified gas leaves the washing tower at 5. After leaving the scrubber the acid used for the washing is freed from the dissolved hydrogen phosphides by adding an oxidizing reagent as for instance hydrogen peroxide, nitric acid and chromate. Thus nonvolatile phosphorus acids are formed, which dissolve in the washing acid and the presence of which does no harm even in higher concentrations. Generally only so much of the oxidizing reagent may be added as is necessary for the reaction with hydrogen phosphides dissolved in the acid. A surplus has to be avoided because if there is an oxidizing reagent in the washing acid, acetylene may be oxidized too. That would cause not only a loss of acetylene but there would also be a waste of the oxidizing reagent, which is still more important for the economy of the process. As can be seen from the example, the regenerating of the washing acid may be obtained by continually adding a suitable oxidizing reagent, for instance chromate or hydrogen peroxide. The acid leaving the washing tower is therefore mixed in the liquid receiver 6 with the oxidizing reagent coming from the reservoir 7. The quantity of the oxidizing reagent must be just sufficient to oxidize the hydrogen phosphides washed out. A pump raises the washing acid from the liquid receiver to the higher based reservoir 8 from which it is led back to the scrubber.

By utilizing a powerful oxidizing reagent such as one of those named above the oxidation of the adsorbed hydrogen phosphides is effected thereby practically immediately, so that the washing acid raised into the reservoir 8, is already regenerated and entirely free from hydrogen phosphides. The oxidizing reagents named above by no means completes the list of those that can be used. The oxidizing agents that are especially suitable however are those which do not cause an objectionable dilution of the washing acid or a loading with products of reaction which, for example, do not dissolve in the acid or are gaseous.

The oxidation of the adsorbed phosphides in the washing acid may also be done in a non-continuous manner. In this case the acid circulating in the washing plant is removed from the plant and is oxidized as soon as its efficiency shows a tendency to diminish. This process is advantageous if the phosphides are to be oxidized by means of a more slowly reacting oxidizing reagent. Thus it is possible to oxidize the hydrogen phosphides by the oxygen of the air. For this purpose the used washing acid is caused to flow for a more or less prolonged period of time in contact with countercurrent streams of air or oxygen in a tower filled with filling material. The regeneration of the washing acid with the help of gaseous oxygen can be essentially accelerated by adding suitable oxidation-catalysts, for instance heavy-metal-salts.

If the circulation of the washing acid is brought about by means of an air lift pump, which is run by compressed air, as illustrated in the drawing, the oxidation of the hydrogen phosphides can thus be obtained, at least partly, by gaseous oxygen. Air which is supplied from a compressor (not shown) is forced through the conduit 9 into the conduit 12. As a result, the washing acid which flows from the liquid receiver 6 through the conduit 21 into the conduit 12 is lifted by the air into the reservoir 8. The raising of the liquid in the conduit 12 is accomplished in a known manner by the lifting action of the air flowing upwardly through the column of liquid in the conduit 12. In the reservoir 8 the air is separated from the washing acid and the acid flows from the reservoir 8 to the scrubber 2 as described above.

The present process has the advantage over the customary methods that there are no interruptions caused by the emptying and filling of the purifiers. Also the utilization of the oxidizing reagent is practically complete. Finally the washing towers require much less room than the dry purifiers used heretofore. Moreover, the phosphorus removed from the gas can be recovered in the form of compounds. If, for example, sulphuric acid is used for the washing, the phosphorus which is removed from the gas can be quite easily converted into phosphoric acid, for the hydrogen phosphides adsorbed in the acid are converted into phosphoric acid as soon as the washing acid is warmed up to 150–200° for a short time. Simultaneously sulphur dioxide is formed.

I claim:

1. A process for the purification of a hydrocarbon gas containing hydrogen phosphide, which comprises the steps of washing said gas with a concentrated mineral acid substantially free of oxidizing agent to absorb and form a solution of such phosphide without oxidizing said phosphide during such washing; regenerating the resulting used washing acid by removing such acid from absorptive contact with said gas and treating said used washing acid with an oxidizing agent for oxidizing said phosphide to compounds soluble in said acid, said oxidizing agent being employed in not more than the stoichiometric amount required to oxidize said phosphide; and again bringing such regenerated washing acid substantially free from hydrogen phosphide and oxidizing agent into washing contact with gas containing hydrogen phosphide.

2. A process for the purification of acetylene containing hydrogen phosphide, which comprises the steps of washing said acetylene with concentrated sulfuric acid, substantially free of oxidizing agent and containing not in excess of about one-fourth its weight of water, to form a solution of such phosphide without oxidizing the latter during such washing; regenerating the resulting used sulfuric acid by removing such acid from absorptive contact with said acetylene and treating said used acid with nitric acid, to oxidize said phosphide to non-volatile compounds soluble in said sulfuric acid, said nitric acid being employed in not more than the stoichiometric amount required to oxidize said phosphide; and again bringing such regenerated sulfuric acid substantially free from hydrogen phosphide and nitric acid into washing contact with gas containing hydrogen phosphide.

3. In a process for the purification of gases containing hydrogen phosphide; the steps which comprise washing such gas with concentrated sulfuric acid substantially free of oxidizing agents by flowing said acid downwardly in absorptive contact with said hydrogen phosphide-containing gas to form a solution of such phosphide without oxidizing the latter during such washing, removing such acid thus used and containing dissolved hydrogen phosphide out of contact with such gas, bringing such used acid into contact with an oxygen-containing gas capable of oxidizing hydrogen phosphide in the presence of such acid to oxidize the dissolved hydrogen phosphide to non-volatile compounds soluble in said used acid and thereby regenerate the used acid, raising the used acid to an elevated level by the lifting action of such oxygen-containing gas rising through said used acid, and again flowing such acid substantially free of oxidizing agents downwardly in absorptive contact with gas containing hydrogen phosphide for further absorption of hydrogen phosphide.

4. In a process for the purification of gases containing hydrogen phosphide, the steps which comprise washing such gas with sulfuric acid substantially free of oxidizing agent and containing not in excess of about one-fourth its weight of water by flowing said acid downwardly in contact with and countercurrently to the flow of said gas to form a solution of such phosphide without oxidizing the latter during such washing; regenerating the resulting used sulfuric acid by removing the latter from absorptive contact with said gas and raising the used acid to an elevated level by the lifting action of an oxygen-containing gas rising through said used acid, and simultaneously oxidizing said phosphide catalytically in the presence of a heavy metal salt to non-volatile compounds soluble in said acid; and again flowing such acid downwardly in absorptive contact with gas containing hydrogen phosphide for purification of such gas.

5. Process for the removal of hydrogen phosphide from gas, which comprises the steps of washing said gas with a concentrated non-oxidizing mineral acid capable of dissolving hydrogen phosphide from said gas; withdrawing the resulting used wash acid from contact with said gas; treating said used wash acid, while out of contact with said gas, with an oxidizing agent capable of oxidizing hydrogen phosphide in the presence of said acid, to oxidize only a part of the dissolved hydrogen phosphide; bringing such treated wash acid into contact with a second oxidizing agent, capable of oxidizing hydrogen phosphide in the presence of such acid, to oxidize substantially all of the remaining hydrogen phosphide, one of said oxidizing agents being a gas containing molecular oxygen; and passing such regenerated wash acid into contact with gas containing hydrogen phosphide.

6. Process for the removal of hydrogen phosphide from gas, which comprises the steps of washing said gas with a concentrated non-oxidizing mineral acid capable of dissolving hydrogen phosphide from said gas; withdrawing the resulting used wash acid from contact with said gas; treating said used wash acid, while out of contact with said gas, with an oxidizing agent capable of oxidizing hydrogen phosphide in the presence of such acid, said agent being employed in an amount sufficient to oxidize only a part of the dissolved hydrogen phosphide; thereafter bringing such treated wash acid into contact with gas containing molecular oxygen to oxidize substantially all of the remainder of the hydrogen phosphide; and bringing such wash acid substantially free from hydrogen phosphide and oxidizing agent into contact with said gas containing hydrogen phosphide.

FRIEDRICH ROTTMAYR.